United States Patent [19]
Yamamuro et al.

[11] Patent Number: 5,877,820
[45] Date of Patent: Mar. 2, 1999

[54] OPTICAL TRANSMISSION OF SIGNALS

[75] Inventors: Toshikatsu Yamamuro, Kanagawa; Tadashi Ezaki, Tokyo; Hiroshi Moriuchi, Saitama, all of Japan

[73] Assignee: Sony Corporation, Tokyo, Japan

[21] Appl. No.: 766,026

[22] Filed: Dec. 13, 1996

[30] Foreign Application Priority Data

Dec. 19, 1995 [JP] Japan ................................. 7-330707

[51] Int. Cl.⁶ .................................................. H04N 7/220
[52] U.S. Cl. .......................................... 348/723; 348/724
[58] Field of Search ................................... 348/723, 724, 348/642; 359/109, 180, 181; H04N 7/220, 11/00, 11/06, 11/12, 11/14, 11/16

[56] References Cited

FOREIGN PATENT DOCUMENTS

0394772 A 10/1990 European Pat. Off. .
0267086 11/1988 Japan ............................. H04N 7/220
8037659 6/1996 Japan ............................. H04N 7/220

OTHER PUBLICATIONS

Patent Abstracts of Japan, vol. 011, No. 240 (E–529), Aug. 6, 1987 of JP 62 051885 Mar. 6, 1987.
Patent Abstracts of Japan, vol. 018, No. 069 (E–1502), Feb. 4, 1994 of JP 05 284144 Oct. 29, 1993.
Patent Abstracts of Japan, vol. 014, No. 022 (E–874), Jan. 17, 1990 of JP 01 264086 Oct. 20, 1989.
Patent Abstracts of Japan, vol. 009, No. 240 (E–345), Sep. 26, 1985 of JP 60 090483 May 21, 1985.

*Primary Examiner*—David E. Harvey
*Attorney, Agent, or Firm*—Frommer Lawrence & Haug, LLP; William S. Frommer

[57] ABSTRACT

In optically transmitting a video signal comprised of luminance and chrominance signals which are frequency modulated to provide an FM luminance signal and an FM chrominance signal in respective adjacent frequency bands, such as, 6 to 20 MHz and 20 to 30 MHz, respectively, whereupon, infrared signals corresponding to the FM luminance and chrominance signals are output by respective emitting diodes, a carrier frequency for the FM chrominance signal is set, for example, between 25.93 and 26.08 MHz, so that the lower sideband wave of the FM chrominance signal is spaced by a substantial frequency from a frequency band in which a secondary distortion of the FM luminance signal is substantially generated. Further, the upper sideband wave of the FM chrominance signal is removed, as in a trap circuit, for ensuring that the transmitted FM chrominance signal will be accommodated in the respective frequency band therefor when its carrier frequency is set, as above. When the infrared signals corresponding to the FM luminance and chrominance signals are received by a photodiode and thereby transduced to respective FM modulated components output by the photodiode and then preamplified in common prior to separation, the component corresponding to the FM chrominance signal has the removed upper sideband wave restored by amplitude limiting thereof.

20 Claims, 9 Drawing Sheets

OPTICAL TRANSMISSION OF SIGNALS

BACKGROUND OF THE INVENTION

1. Field of the Invention

This invention relates generally to an apparatus and method for effecting the optical transmission of signals, and more particularly is directed to the optical transmission of a video signal comprised of a luminance signal and a carrier chrominance signal.

2. Description of the Related Art

An optical transmission system has been proposed for transmitting a luminance signal and a carrier chrominance signal without using wire. Such proposed system is comprised of an optical transmitter and an optical receiver to be hereinafter further described with reference to FIGS. 5 and 7, respectively, and which may be used, for example, for transmitting a video signal according to NTSC standards.

Figure 5:
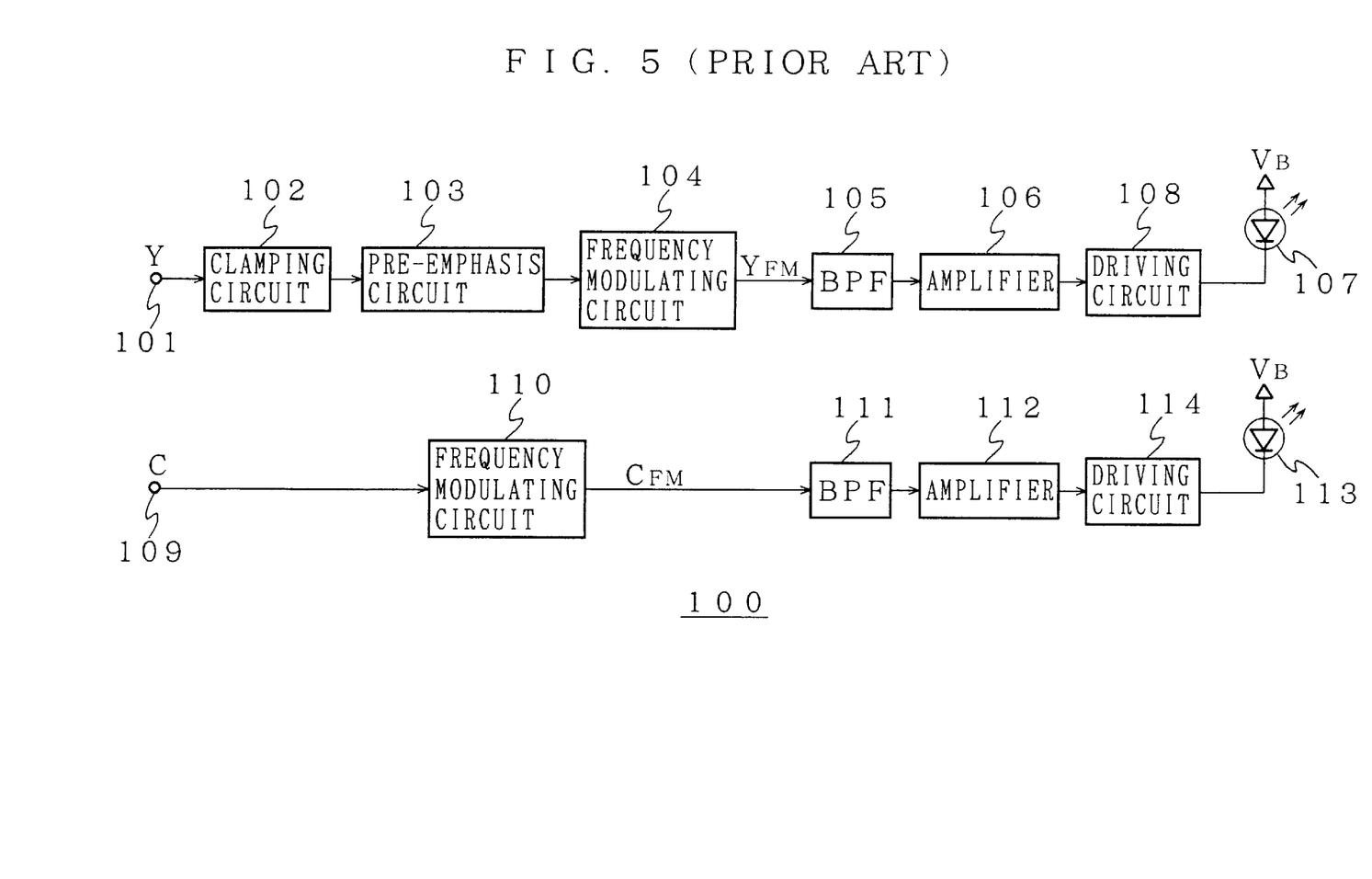
FIG. 5 is a block diagram, similar to that of FIG. 4, but showing an arrangement employed in an optical transmitter according to the prior art.

As shown in FIG. 5, the previously proposed optical transmitter 100 includes an input terminal 101 for receiving a luminance signal Y, a clamping circuit 102 receiving the luminance signal Y from the terminal 101 for making even the levels of the sink tip and the pedestal in the luminance signal, a pre-emphasis circuit 103 for emphasizing the high frequency band of the luminance signal received from the clamping circuit 102, and a frequency modulating (FM) circuit 104 for modulating the frequency of a carrier wave by the luminance signal Y which has had its high frequency band emphasized in the circuit 103. By making even the levels of the sink tip and the pedestal in the clamping circuit 102, a carrier wave can be modulated in the frequency modulating circuit 104 so that, for example, the sink tip of the luminance signal and the white peak of the luminance signal correspond to the frequencies 11.5 MHz and 13.5 MHz, respectively, in the frequency modulated luminance signal $Y_{FM}$ issuing from the frequency modulating circuit 104. The frequency modulated luminance signal $Y_{FM}$ is supplied from the modulating circuit 104 through a band-pass filter 105 for limiting the band thereof, for example, to a band of 6 to 20 MHz, to an amplifier 106, and the resulting amplified FM luminance signal $Y_{FM}$ is applied to a driving circuit 108 which correspondingly drives an infrared-emitting diode 107 constituting an electro-optical transducing means for outputting an optical signal corresponding to the FM luminance signal $Y_{FM}$. The cathode of the diode 107 is shown connected to an output of the driving circuit 108, while the anode of the diode 107 is connected to a power terminal to which a suitable d.c. voltage $V_B$ is supplied.

The optical transmitter 100 is further shown on FIG. 5 to be provided with an input terminal 109 for receiving a carrier chrominance signal C having a chrominance subcarrier frequency of 3.58 MHz, and a frequency modulating circuit 110 for modulating the frequency of a carrier wave by the carrier chrominance signal C supplied to the terminal 109. In the case of the existing optical transmitter 100 being here described, a signal with the frequency of 25 MHZ is used as a carrier wave in the frequency modulating circuit 110. A band-pass filter 111 receives the FM chrominance signal $C_{FM}$ output from the frequency modulating circuit 110 for limiting the band thereof to 20 to 30 MHz. An amplifier 112 suitably amplifies the band-limited FM chrominance signal $C_{FM}$ prior to supplying the same to a driving circuit 114 for an infrared-emitting diode 113 which acts as an electro-optical transducing means for outputting an optical signal corresponding to the FM chrominance signal $C_{FM}$. As shown, the cathode of the diode 113 is connected to an output of the driving circuit 114, while the anode of the diode 113 is connected to a power terminal to which a suitable d.c. voltage $V_B$ is supplied.

Figure 6:
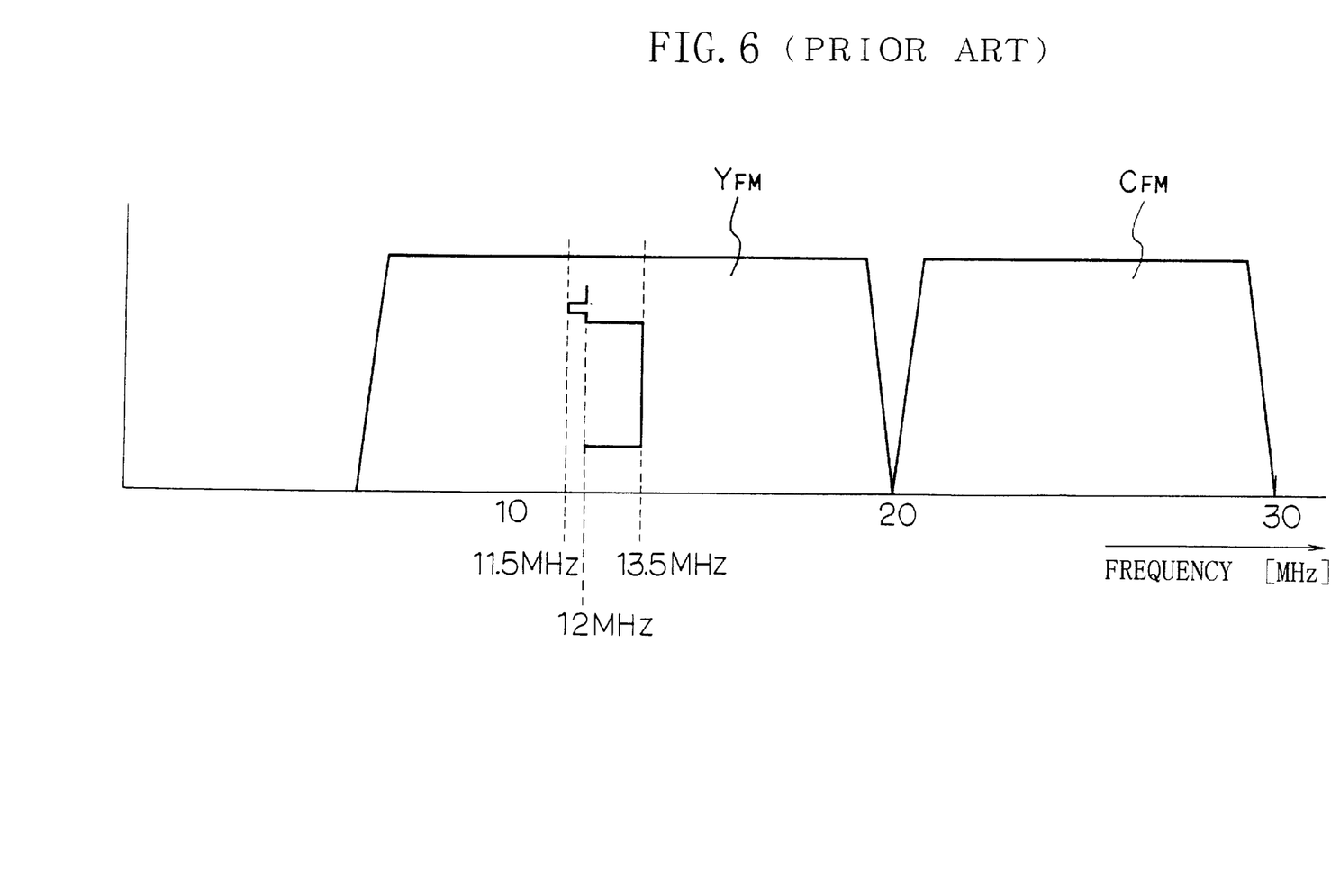
FIG. 6 is a frequency diagram showing the frequency bands allocated to the modulated luminance and chrominance signals to be transmitted by the arrangement according to the prior art shown in FIG. 5.

In the operation of the existing optical transmitter 100, a luminance signal Y supplied through the input terminal 101 has the levels of its sink tip and pedestal made even in the clamping circuit 102, and then has its high frequency band emphasized in the pre-emphasis circuit 103 prior to being frequency modulated in the circuit 104. The band of the FM luminance signal $Y_{FM}$ output from the frequency modulating circuit 104 is limited to 6 to 20 MHz by the band-pass filter 105 prior to it being amplified by the amplifier 106 and then supplied to the driving circuit 108 by which an infrared signal corresponding to the FM luminance signal $Y_{FM}$ is output from the diode 107 as a transmitted optical signal. A carrier chrominance signal C supplied through the input terminal 109 to the frequency modulating circuit 110 is there subjected to frequency modulation processing. The resulting FM chrominance signal $C_{FM}$ output from the circuit 110 is limited to the band of 20 to 30 MHz by the band-pass filter 111 prior to being amplified by the amplifier 112 and then supplied to the driving circuit 114 so that an infrared signal corresponding to the FM chrominance signal $C_{FM}$ is output from the diode 113 as a transmitted optical signal. The frequency bands of the optical signals transmitted from the diodes 107 and 113 of the optical transmitter 100 shown in FIG. 5, and which correspond to the FM luminance signal $Y_{FM}$ and the FM chrominance signal $C_{FM}$, respectively, are shown in FIG. 6.

Figure 7:
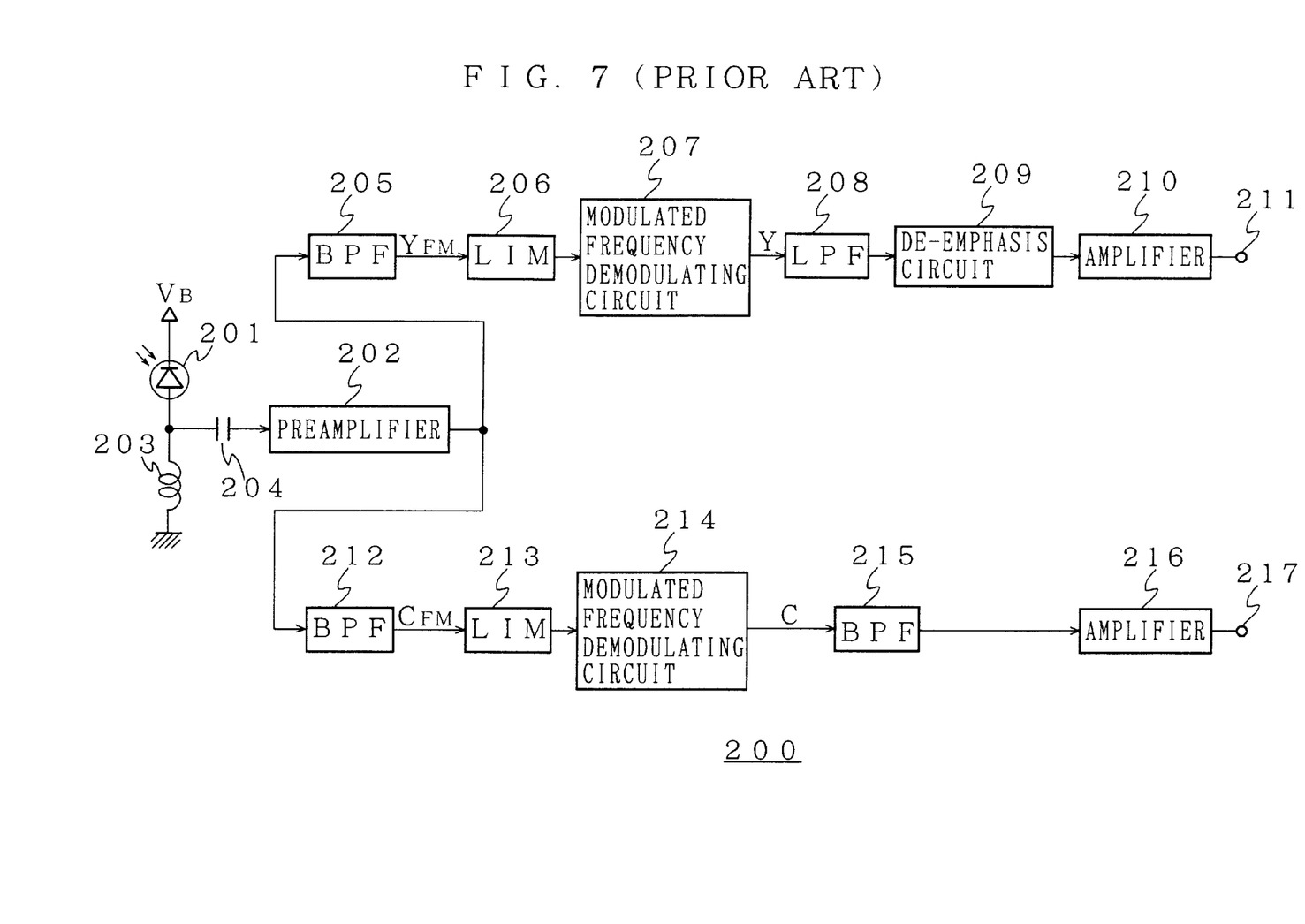
FIG. 7 is a block diagram showing circuit arrangements employed in an optical receiver according to the prior art, and which may also be employed in an optical receiver included in an optical transmission system embodying the present invention.

Referring now to FIG. 7, it will be seen that the existing optical receiver 200 suitable for receiving optical signals transmitted by the transmitter 100 includes a photodiode 201 serving as an electro-optical transducing means for transducing transmitted infrared or other optical signals to a corresponding electrical signal and a preamplifier 202 for amplifying an electrical signal output from the photodiode 201. The anode of the photodiode 201 is grounded through a coil 203 for providing bias, and the cathode of the photodiode 201 is connected to a power terminal to which a suitable d.c. voltage $V_B$ is supplied. A junction between the anode of the photodiode 201 and the coil 203 is connected to the input terminal of the preamplifier 202 through a capacitor 204 for reducing direct current. The optical receiver 200 further includes a band-pass filter 205 with a pass band of 6 to 20 MHz for extracting an FM luminance signal $Y_{FM}$ from an output of the preamplifier 202, a limiter 206 for limiting the amplitude of the FM luminance signal $Y_{FM}$ extracted by the band-pass filter 205, and an FM demodulating circuit 207 for demodulating the FM luminance signal $Y_{FM}$ output from the limiter 206. A low-pass filter 208 limits the band of a luminance signal Y output from the FM modulating circuit 207, whereupon, the high frequency band of such luminance signal Y is attenuated in a de-emphasis circuit 209 prior to the supplying of the luminance signal Y through an amplifier 210 to an output terminal 211.

The optical receiver 200 is further provided with a band-pass filter 212 also connected with the output of the preamplifier 202 and having a pass band of 20 to 30 MHz for extracting an FM chrominance signal $C_{FM}$ from the output of the preamplifier. Such extracted FM chrominance signal $C_{FM}$ has its amplitude limited in a limiter 213 and is then supplied to an FM demodulating circuit 214 for obtaining a carrier chrominance signal C. A band-pass filter 215 receives the chrominance signal C from the demodulating circuit 214 for limiting the band thereof prior to the supplying of such carrier chrominance signal through an amplifier 216 to an output terminal 217.

Figure 8:
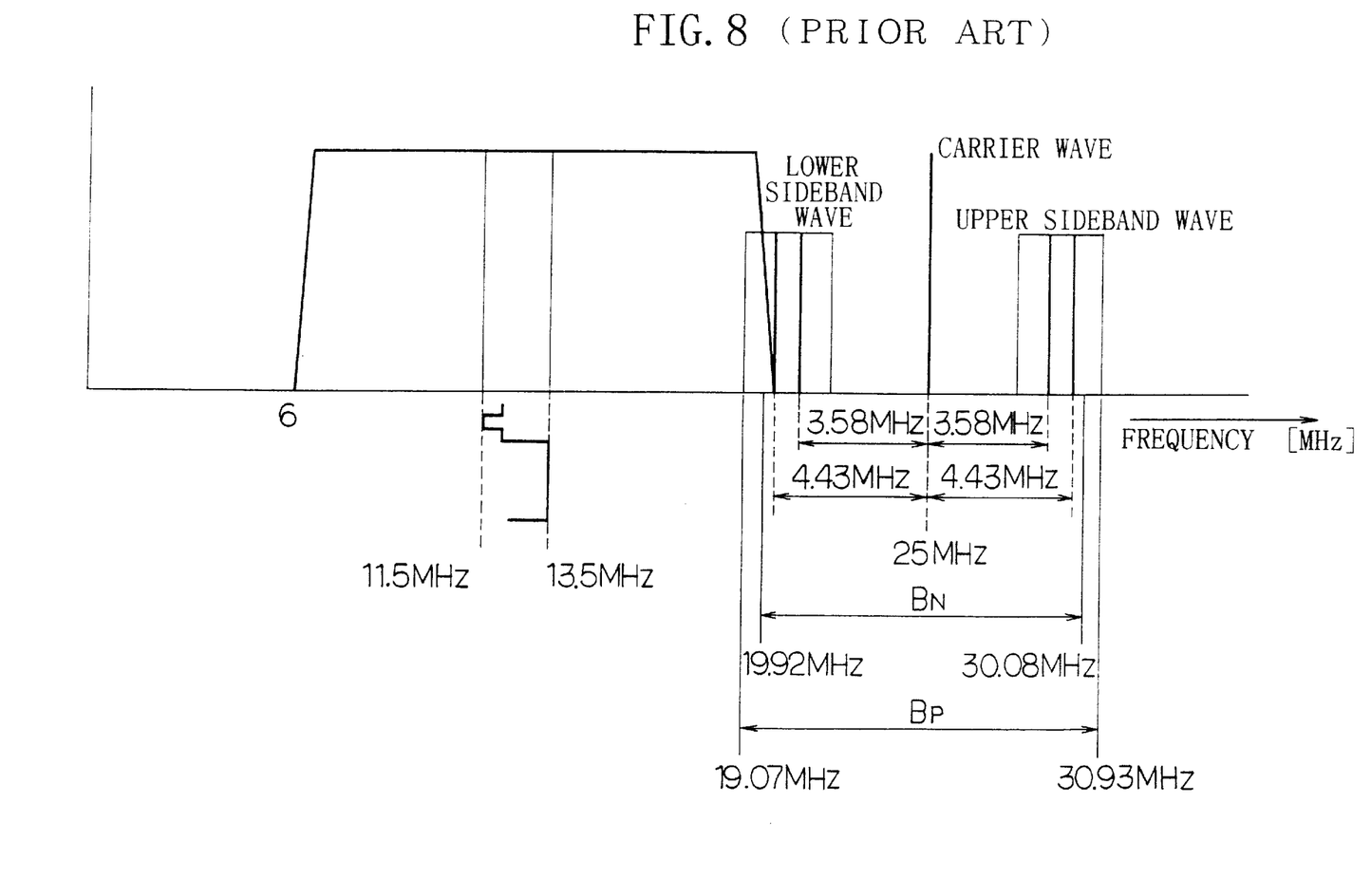
FIG. 8 is a frequency diagram to which reference will be made in explaining problems encountered in the transmission of an FM chrominance signal according to the NTSC and PAL standards using the optical transmitter of FIG. 5.

In transmitting a video signal according to the NTSC standard in which the frequency of a chrominance subcarrier is 3.58 MHz, if the transmission band of a carrier chrominance signal C is 1.5 MHz, the band required for normal double-sideband frequency modulation is 2×(3.58+1.50)= 10.16 MHz. In transmitting a video signal according to the PAL standard in which the frequency of a chrominance subcarrier is 4.43 MHz, the band required for normal double-sideband frequency modulation is 2×(4.43+1.5)= 11.86 MHz. Therefore, if frequency modulation is performed using a carrier wave of 25 MHz in the frequency modulating circuit 110 in the optical transmitter 100 of FIG. 5, the transmission band $B_N$ required for the NTSC standard extends from 19.92 MHz to 30.08 MHz, as shown on FIG. 8, and the transmission band $B_P$ required for the PAL standard extends from 19.07 MHz to 30.93 MHz, as also shown in FIG. 8. Therefore, the existing optical transmitter 100 described above with reference to FIG. 5 cannot be used with either the NTSC or the PAL standard for transmitting the FM chrominance signal $C_{FM}$ within the band of 20 to 30 MHz which is proposed for optical transmission of video signals by the Electronic Industries Association of Japan (EIAJ).

Figure 9:
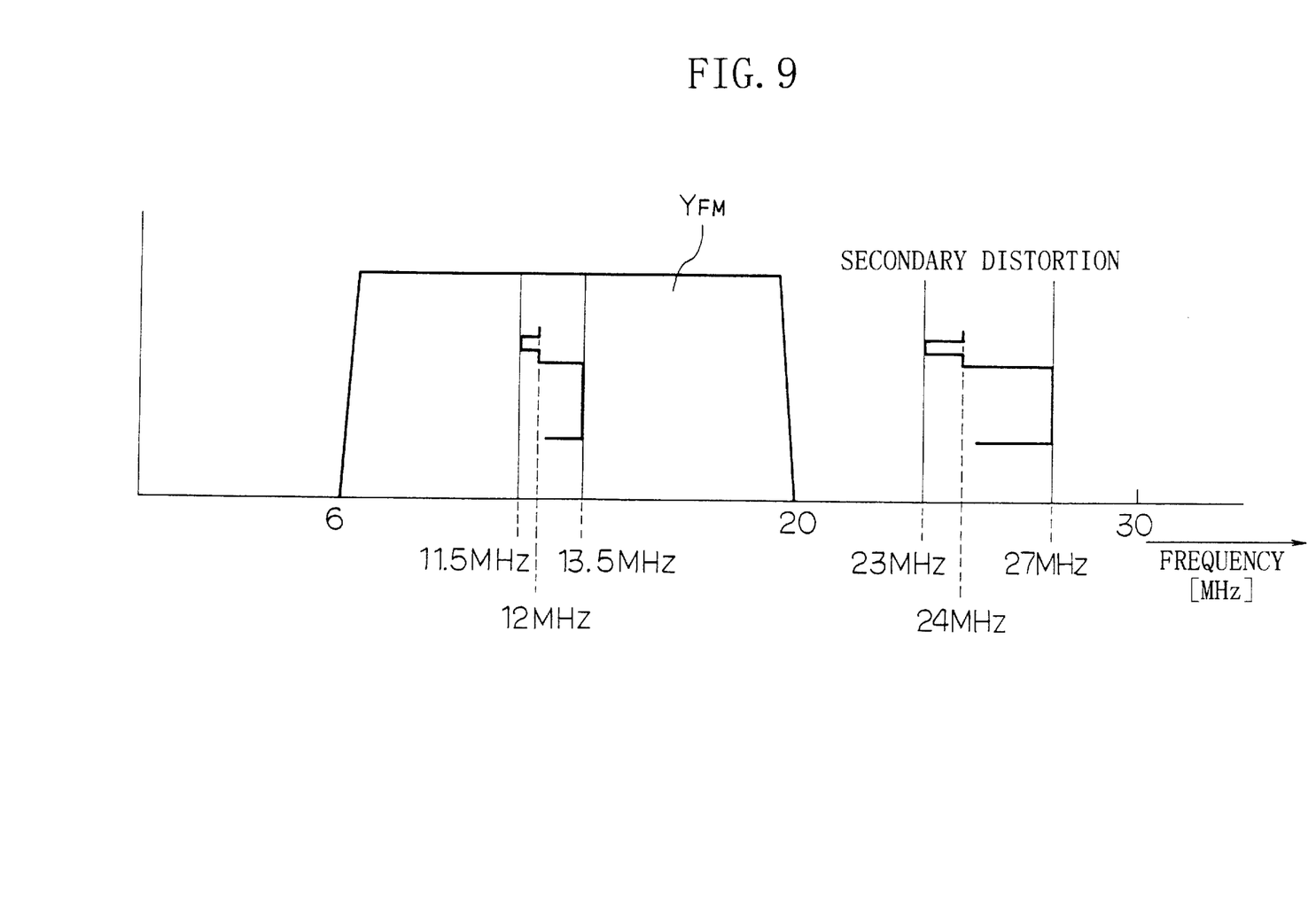
FIG. 9 is a frequency diagram to which reference will be made in explaining the generation of a secondary harmonic distortion by an FM luminance signal.

A further problem arises if the optical receiver 200 described with reference to FIG. 7 is employed for receiving the transmitted infrared or other optical signals from the transmitter 100. More specifically, in the receiver 200, the transmitted optical signals are transduced to an electric signal by the photodiode 201 and, after such electric signal is amplified by the preamplifier 202, an FM luminance signal $Y_{FM}$ and an FM chrominance signal $C_{FM}$ are extracted from the output of the preamplifier 202 by the band-pass filters 205 and 212, respectively. Since both the FM luminance signal $Y_{FM}$ and the FM chrominance signal $C_{FM}$ are frequency multiplexed or combined when amplified in the preamplifier 202, a secondary distortion of the FM luminance signal $Y_{FM}$ is generated within the band occupied by the FM chrominance signal $C_{FM}$ by reason of the non-linearity of the preamplifier 202, as shown in FIG. 9, and the FM chrominance signal $C_{FM}$ output from the band-pass filter 212 is undesirably influenced by such secondary distortion.

OBJECTS AND SUMMARY OF THE INVENTION

Accordingly, it is an object of this invention to provide for the optical transmission of a plurality of signals, such as, a luminance signal and a chrominance signal, in respective frequency bands which are maintained within a predetermined range.

Another object of this invention is to provide for the optical transmission, as aforesaid, while reducing the effect of a secondary harmonic distortion of an FM luminance signal upon an FM chrominance signal.

In accordance with an aspect of this invention, an optical transmitter is provided with signal processing means for respectively modulating a plurality of electrical signals, such as, luminance and chrominance signals, and providing respective modulated signals in a plurality of respective frequency bands with at least one of the modulated signals, such as, the modulated chrominance signal, having sideband waves at opposite sides of the respective frequency band, means, such as a trap circuit, for removing one of the sideband waves from the at least one of the modulated signals having sideband waves at opposite sides of its respective frequency band, and electro-optical transducing means, such as, emitting diodes, for respectively transducing the at least one modulated signal from which one sideband wave has been removed, and another of the plurality of modulated signals into respective infrared or other optical signals.

In accordance with another aspect of this invention, in a case where the electrical signals being transmitted include a luminance signal and a chrominance signal which are frequency modulated, the frequency modulated chrominance signal has the sideband waves at opposite sides of its respective frequency band with the upper of such sideband waves being the one that is removed, and a carrier frequency of the frequency modulated chrominance signal is set so that the lower sideband wave that remains is spaced by a substantial frequency from a band in which a secondary, or more properly secondary harmonic, distortion of the frequency modulated luminance signal is substantially generated.

In accordance with still another aspect of the invention, an optical receiver used in association with an optical transmitter, as aforesaid, includes receiving electro-optical transducing means, for example, constituted by a photodiode, for receiving the transmitted optical signals and for transducing the latter into a corresponding electrical output which is preamplified prior to the extraction therefrom, as by respective band-pass filters, of the frequency bands assigned to the transmitted signals, respectively, such as, the frequency bands assigned to the frequency modulated luminance and chrominance signals, so as to provide respective frequency modulated received luminance and chrominance signals, and means, for example, in the form of an amplitude limiter, for restoring the upper sideband wave to the frequency modulated received chrominance signal prior to demodulating the FM received luminance and chrominance signals, respectively.

The above, and other objects, features and advantages of the invention, will be apparent in the following detailed description of illustrative embodiments thereof which is to be read in connection with the accompanying drawings.

DESCRIPTION OF THE PREFERRED EMBODIMENTS

Figure 1:
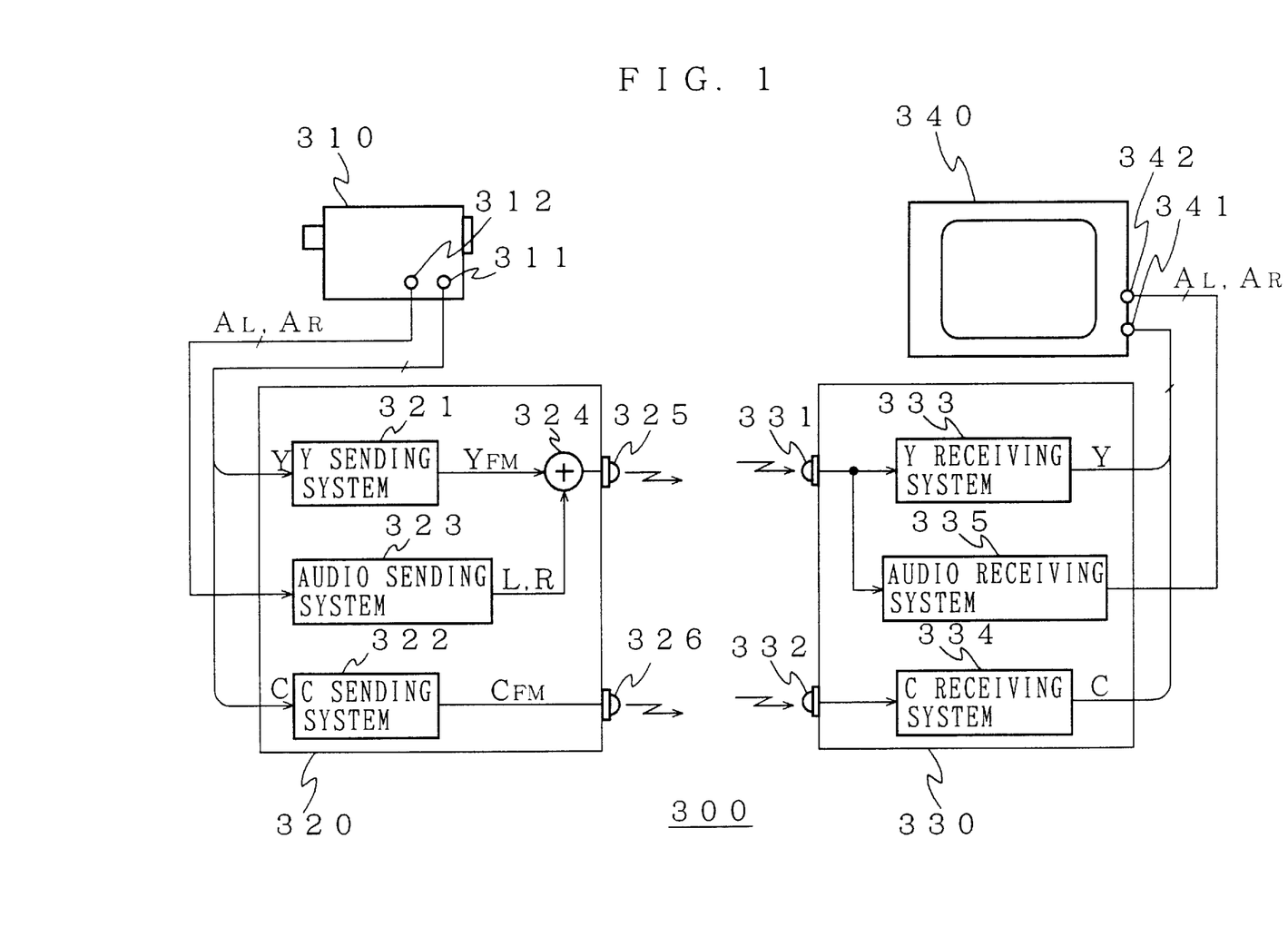
FIG. 1 is a block diagram of an optical transmission system according to an embodiment of the present invention shown associated with a camera integrated VTR and a television receiver or monitor for optically transmitting television or video signals therebetween.

Referring to the drawings in detail, and initially to FIG. 1 thereof, an embodiment of the present invention is there shown incorporated in a system 300 for the wireless or optical transmission of a television or video signal between a camera integrated video tape recorder (VTR) 310 and a television receiver 340. The transmission system 300 generally comprises an optical transmitter 320 situated adjacent to, and, electrically connected with the camera integrated VTR 310 and an optical receiver 330 situated adjacent to, and electrically connected with the television receiver 340 and adapted to receive infrared or other optical signals transmitted or sent by the transmitter 320 which may be remote therefrom. More specifically, a luminance signal Y and a carrier chrominance signal C are supplied from a video output terminal 311 of the VTR 310 to a Y or luminance sending system 321 and a C or chrominance sending system 322, respectively, included in the optical transmitter 320, and audio signals $A_L$ and $A_R$ for left and right channels, respectively, are supplied from an audio output terminal 312 of the VTR 310 to an audio sending system 323 also included in the transmitter 320. The sending systems 321, 322 and 323 process, for example, by frequency modulation, the luminance signal Y, the carrier chrominance signal C and the audio signals $A_L$ and $A_R$, respectively, for forming an FM luminance signal $Y_{FM}$, an FM chrominance signal $C_{FM}$ and FM audio signals L and R, respectively. The transmitter 320 further generally includes an adder 324 for adding the FM luminance signal $Y_{FM}$ output from the luminance sending system 321 and the FM audio signals L and R output from the audio sending system 323, an infrared-emitting diode 325 for outputting an infrared or other optical signal corresponding to the signal output from the adder 324, and an infrared-emitting diode 326 for outputting an infrared or other optical signal corresponding to the FM chrominance signal $C_{FM}$ output from the chrominance sending system 322.

Figure 2:
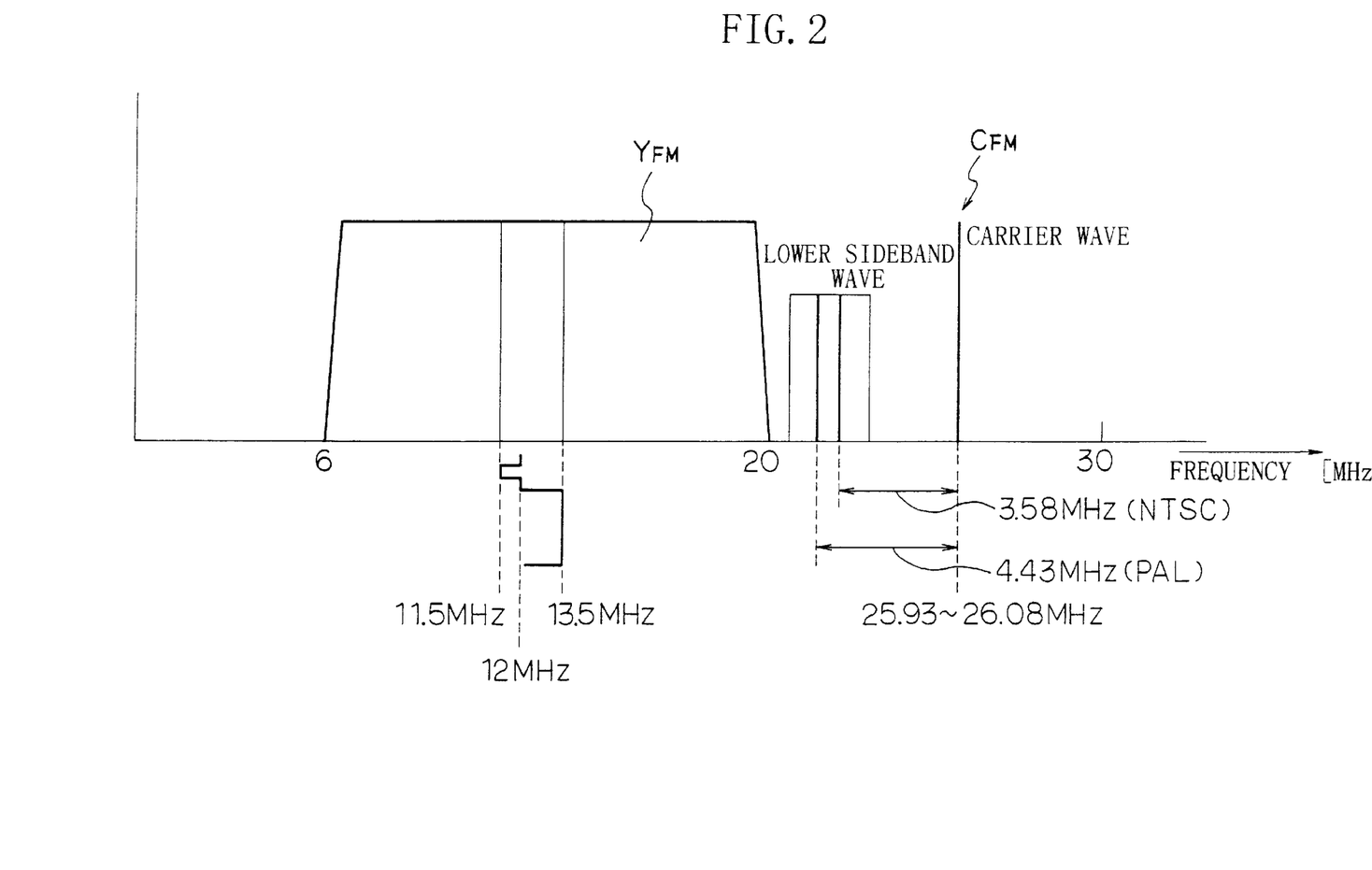
FIG. 2 is a frequency diagram to which reference will be made in explaining the processing of an FM chrominance signal in an optical transmitter according to this invention.

In the luminance sending system 321, the luminance signal Y is frequency modulated so that, for example, the sink tip of the luminance signal Y corresponds to a frequency of 11.5 MHz and the white peak corresponds to a frequency of 13.5 MHz, while the modulation band of the FM luminance signal $Y_{FM}$ is from 6 MHz to 20 MHz, as shown on FIG. 2.

Figure 3:
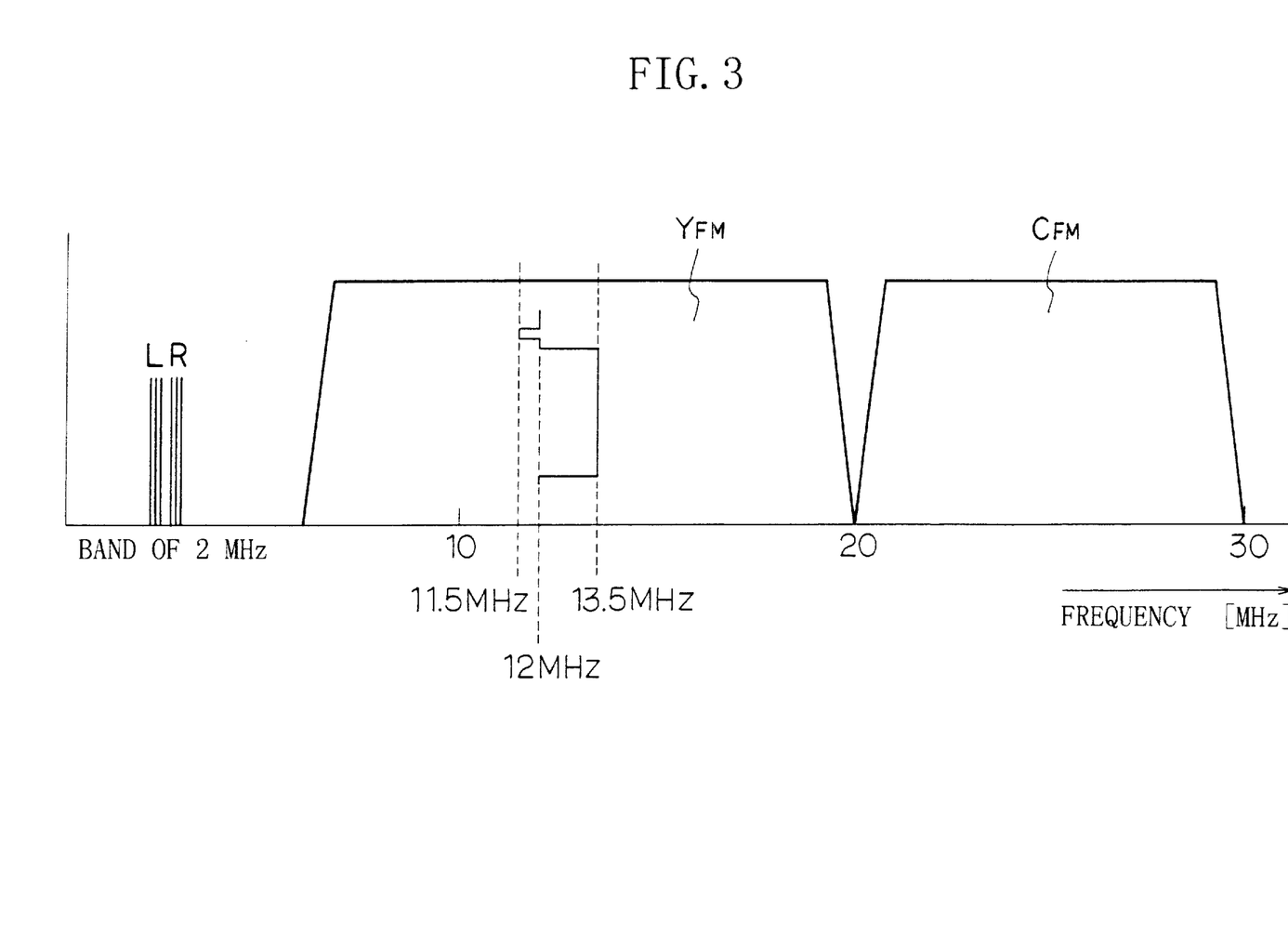
FIG. 3 is a frequency diagram showing the allocation of frequency bands for the transmission of luminance, chrominance and audio signals in an optical transmission system embodying this invention, as shown in FIG. 1.

In the chrominance sending system 322, the upper sideband wave of the FM chrominance signal $C_{FM}$ is removed, as hereinafter described in detail, and a carrier frequency for the FM chrominance signal $C_{FM}$ is set so that the remaining or lower sideband wave is situated at a frequency substantially spaced from the band in which a secondary distortion or secondary harmonic distortion of the FM luminance signal $Y_{FM}$ is mainly generated (as shown on FIG. 9), with the band of the resulting single sideband FM chrominance signal $C_{FM}$ being limited, as shown on FIG. 2, to be clearly within the modulation band of 20 MHz to 30 MHz which has been set by the EIAJ, as shown on FIG. 3.

As shown on FIG. 9, the band in which the secondary distortion of the FM luminance signal $Y_{FM}$ is mainly generated extends from 23 MHz, which is twice as large as the frequency (11.5 MHz) corresponding to the sink tip of the luminance signal, to 27 MHz, which is twice as large as the frequency (13.5 MHz) corresponding to the white peak of the luminance signal. However, since there is no chrominance signal for the duration of the H-sync portion, the band in which the secondary distortion of the FM luminance signal $Y_{FM}$ can influence the FM chrominance signal $C_{FM}$ excludes the H-sync portion, that is, is from 24 MHz, which is twice as large as the frequency (12 MHz) corresponding to the pedestal of the luminance signal, to 27 MHz, which is twice as large as the frequency (13.5 MHz) corresponding to its white peak. By setting the carrier frequency for the FM chrominance signal $C_{FM}$ in a band extending from 25.93 MHz to 26.08 MHz, as shown in FIG. 2, the frequency of the lower sideband wave of the FM chrominance signal remaining in accordance with this invention is maintained well within a band of from 20 MHz to at the most 24 MHz whether the video signal being transmitted is according to the NTSC standard or according to the PAL standard, with the result that the FM chrominance signal is not substantially affected by the secondary distortion of the FM luminance signal $Y_{FM}$. If the transmission system 300 according to this invention is to be used only in connection with signals according to the NTSC standard, a similar result can be achieved by setting the carrier frequency for the FM chrominance signal $C_{FM}$ in the band from 25.08 MHz to 26.08 MHz. On the other hand, if the transmission system 300 is to be employed only in connection with signals according to the PAL standard, then the carrier frequency for the FM chrominance signal can be set anywhere in the band from 25.93 MHz to 26.93 MHz. In any of these cases, the transmitted FM chrominance signal, from which the upper sideband wave has been removed, will be well within the band of 20 MHz to 30 MHz prescribed therefor by the EIAJ, and also apart from the band in which the secondary distortion of the FM luminance signal is mainly generated.

A signal with the frequency of 2 MHz is preferably used in the audio sending system 323 as a carrier wave for the frequency modulation of the audio signals $A_L$ and $A_R$ with the result that the band of the frequency modulated audio signals L and R will be well below the band of the FM luminance signal $Y_{FM}$, as shown on FIG. 3.

The optical receiver 330 is shown on FIG. 1 to generally comprise photodiodes 331 and 332 for receiving infrared or other optical signals transmitted from the emitting diodes 325 and 326, respectively, of the optical transmitter 320 and for transducing the received optical signals into respective electric signals supplied to a luminance receiving system 333 and audio receiving system 35, and to a chrominance receiving system 334, respectively.

The luminance receiving system 333 is operative to extract an FM luminance signal $Y_{FM}$ from the electrical signal output by the diode 331 and to process the extracted signal by demodulating the same so as to obtain a luminance signal Y therefrom. The chrominance receiving system 334 similarly extracts an FM chrominance signal $C_{FM}$ from the electrical signal output by the diode 332 and processes the extracted signal by demodulating the same so as to obtain a carrier chrominance signal C. The audio receiving system 335 extracts FM audio signals L and R from the electrical signal output by the diode 331 and processes the extracted audio signals by demodulating the same so as to obtain audio signals $A_L$ and $A_R$ for left and right channels.

The luminance signal Y from the luminance receiving system 333 and the carrier chrominance signal C obtained in the chrominance receiving system 334 are supplied from the optical receiver 330 to a terminal 341 of the television receiver 340 which is thereby operative to display an image corresponding to the received luminance and carrier chrominance signals Y and C, respectively. The audio signals $A_L$ and $A_R$ for left and right channels obtained in the audio receiving system 335 of the optical receiver 330 are supplied to an audio input terminal 342 of the television receiver 340 which is operative to emit stereo sound corresponding to the received audio signals $A_L$ and $A_R$.

It will be apparent that, by reason of the optical transmission system 300 described above, a luminance signal Y, a carrier chrominance signal C and audio signals $A_L$ and $A_R$ for left and right channels which are output from the camera integrated VTR 310 can be transmitted to the remote television receiver 340 in a wire-less manner by connecting the optical transmitter 320 and the optical receiver 330 with the camera integrated VTR 310 and with the television receiver 340, respectively, and aiming the emitting diodes 325 and 326 of the transmitter 320 toward the photodiodes 331 and 332, respectively, of the receiver 330.

Figure 4:
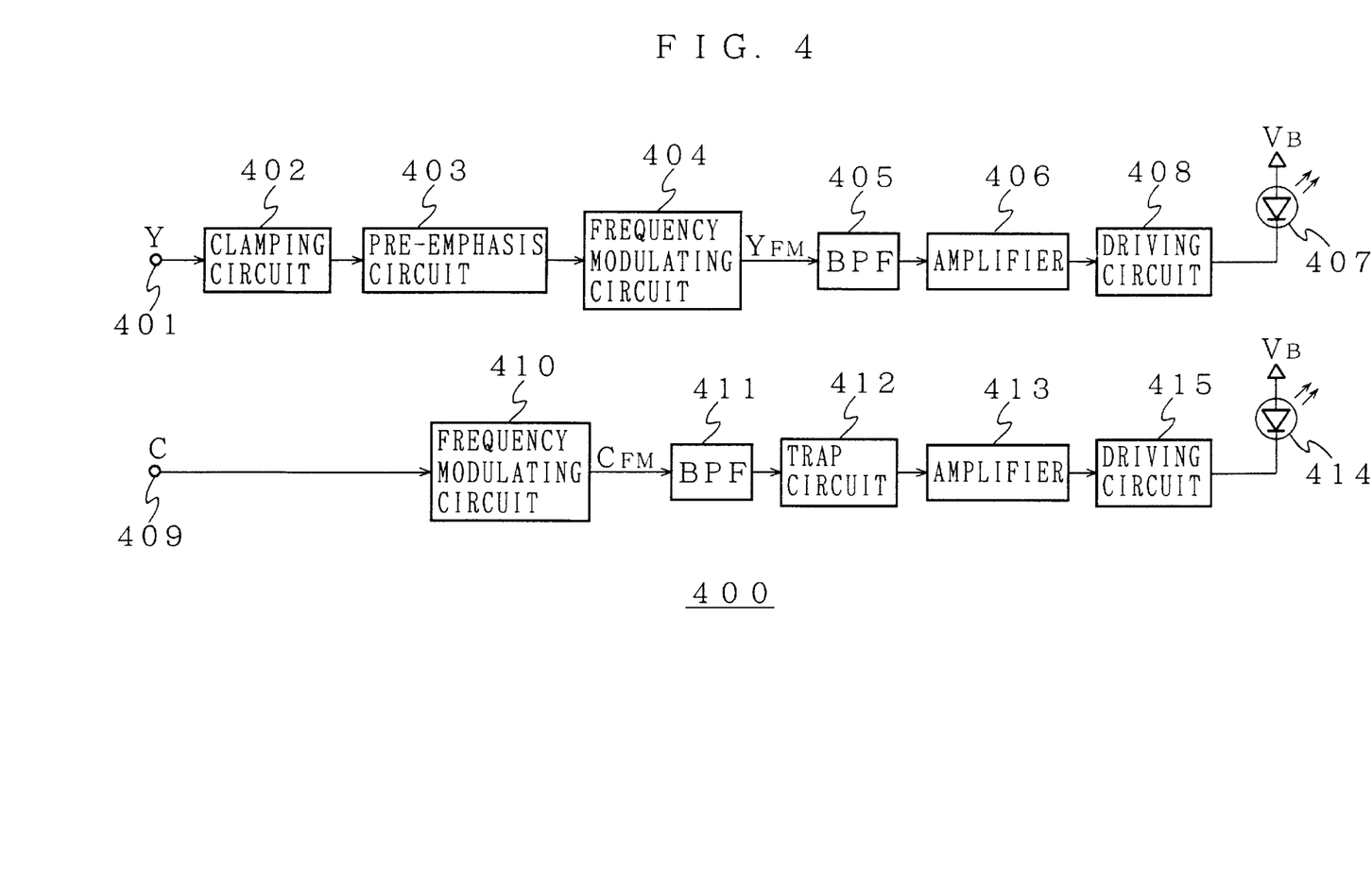
FIG. 4 is a relatively more detailed block diagram showing circuit arrangements for optically transmitting luminance and chrominance signals in an optical transmitter according to an embodiment of this invention, for example, as shown in FIG. 1.

Referring now to FIG. 4, it is to be understood that the optical transmitter 400 which is shown in greater detail therein may be employed for processing the luminance signal Y and the carrier chrominance signal C in the sending systems 321 and 322, respectively, of the optical transmitter 320 previously described as being included in the transmitting system 300 embodying this invention.

The optical transmitter 400 is provided with an input terminal 401 for receiving a luminance signal Y, for example, from the terminal 311 of the camera integrated VTR 310. A clamping circuit 402 receives the luminance signal Y from the input terminal 401 for making even the level of the sink tip and the pedestal of the received luminance signal Y. A pre-emphasis circuit 403 receives the luminance signal Y from the clamping circuit 402 for emphasizing the high frequency band of the received luminance signal Y. The resulting pre-emphasized luminance signal is supplied to a frequency modulation (FM) circuit 404 which is operative to modulate the frequency of a carrier wave by the pre-emphasized luminance signal Y. In the frequency modulating circuit 404, a carrier wave can be modulated so that, for example, in the resulting output FM luminance signal $Y_{FM}$, the sink tip of the luminance signal corresponds to 11.5 MHz and the white peak of the luminance signal corresponds to a frequency of 13.5 MHz as a result of making even the level of the sink tip and the pedestal by means of the clamping circuit 402.

The optical transmitter 400 is also provided with a band-pass filter 405 for limiting the band of the FM luminance signal $Y_{FM}$ output from the frequency modulating circuit 404 to from 6 MHz to 20 MHz, which has been set as the modulation band for the luminance signal. An amplifier 406 amplifies the band-limited FM luminance signal $Y_{FM}$ prior to applying the same to a driving circuit 408 which is operative to drive an infrared-emitting diode 407 which acts as an electro-optical transducing means for outputting an infrared or other optical signal which corresponds to the FM luminance signal $Y_{FM}$ from the amplifier 406. The cathode of the diode 407 is connected to the output terminal of the driving circuit 408 and the anode of the diode 407 is connected to a power terminal to which a suitable d.c. voltage $V_B$ is supplied.

The optical transmitter 400 is also provided with an input terminal 409 for receiving a carrier chrominance signal C, for example, from the terminal 311 of the camera integrated VTR 310 in FIG. 1, and which has a chrominance subcarrier frequency of 3.58 MHZ. A frequency modulation (FM) circuit 410 is connected to the input terminal 409 for modulating the frequency of a carrier wave by the carrier chrominance signal C supplied to such input terminal. In this case, the frequency of the carrier wave used in the frequency modulating circuit 410 is set to be in a predetermined band, for example, from 25.93 MHz to 26.08 MHz, as previously described with reference to FIG. 2, so that the lower sideband wave or primary of the FM chrominance signal $C_{FM}$ issuing from the frequency modulating circuit 410 is at a frequency relatively far from the band in which the secondary distortion of the FM luminance signal $Y_{FM}$ is mainly generated. A band-pass filter 411 receives the FM chrominance signal $C_{FM}$ output from the frequency modulating circuit 410 for limiting the band of such FM chrominance signal to the band from 20 MHz to 30 MHz which is prescribed by the EIAJ as the modulation band therefor. In accordance with this invention, a trap circuit 412 receives the FM chrominance signal $C_{FM}$ from the band-pass filter 411 for removing an upper sideband wave from the previously limited FM chrominance signal. In this case, secondary lower and upper sideband waves are removed from the FM chrominance signal by the band-pass filter 411, and then the trap circuit 412 attenuates or removes the primary upper sideband wave.

The optical transmitter 400 further includes an amplifier 413 for amplifying the FM chrominance signal $C_{FM}$ received from the trap circuit 412 and from which, as shown in FIG. 2, the upper sideband wave has been removed. A driving circuit 415 receives the amplified output of amplifier 413 and correspondingly drives an infrared-emitting diode 414 acting as an electro-optical transducing means for outputting an infrared or other optical signal corresponding to the FM chrominance signal $C_{FM}$ issuing from the amplifier 413. The cathode of the diode 414 is connected to an output terminal of the driving circuit 415 and the anode of such diode is connected to a power terminal to which a suitable d.c. voltage $V_B$ is supplied.

It will be appreciated that, in the case of the optical transmitter 400 in accordance with the present invention, the infrared signal output as a transmitted signal from the diode 414 corresponds to an FM chrominance signal $C_{FM}$ provided with only a lower sideband wave so that such FM chrominance signal can be well within the band of 20 to 30 MHz set therefor by the EIAJ while ensuring that the lower sideband wave that remains is at a frequency far from the band in which the secondary distortion of the FM luminance signal $Y_{FM}$ is mainly generated.

The optical receiver 330 of the system 300 shown in FIG. 1 as an embodiment of the present invention, may be the same as the optical receiver 200 previously described herein with reference to FIG. 7.

When using the optical receiver 200 for receiving the infrared signals transmitted from the transmitter 400, such infrared signals are transduced by the photodiode 201 of the receiver 200 into a corresponding electrical signal having the FM luminance signal and the FM chrominance signal frequency multiplexed or combined therein, and which is supplied to the preamplifier 202, whereupon, the band-pass filters 205 and 212 respectively extract from the preamplified electrical signal the FM luminance signal $Y_{FM}$ and the FM chrominance signal $C_{FM}$. The processing of the FM luminance signal $Y_{FM}$ extracted by the filter 205 in the receiver 200 is believed to be apparent from the earlier description of such receiver. However, in respect to the FM chrominance signal $C_{FM}$ extracted by the band-pass filter 212, it is to be noted that the upper sideband wave is lacking from such extracted signal as supplied to the amplitude limiter 213. Further, it is to be noted that, in removing the upper sideband wave from the FM chrominance signal $C_{FM}$ by means of the trap circuit 412 in the transmitter 400, the resulting FM signal is made to include an AM component. That AM component of the FM chrominance signal supplied to the amplitude limiter 213 is removed therein and, as a consequence, the limiter 213 restores the removed upper sideband wave. In restoring the previously removed upper sideband wave, the amplitudes of the lower and upper sideband waves of the FM chrominance signal issuing from the limiter 213 are substantially reduced so that the amplitude of the demodulated chrominance signal C obtained from the circuit 214 is reduced relative to its original amplitude. However, the foregoing can be easily remedied by suitably adjusting the demodulated chrominance signal level.

Since the transmitted FM chrominance signal $C_{FM}$, as preamplified with the transmitted FM luminance signal $Y_{FM}$ in the preamplifier 202, is comprised of only its lower sideband wave and such lower sideband wave of the transmitted FM chrominance signal is at a frequency substantially spaced from the band in which the secondary distortion of the FM luminance signal is mainly generated, the effect upon the FM chrominance signal $C_{FM}$ extracted by the band-pass filter 212 from the output of the preamplifier 202 of any secondary distortion of the FM luminance signal $Y_{FM}$ generated by the preamplifier is eliminated or at least substantially reduced. Therefore, a satisfactory carrier chrominance signal C which is hardly influenced by any secondary distortion of the FM luminance signal $Y_{FM}$ can be supplied to the output terminal 217.

In the above-described embodiment of this invention, the upper sideband wave of the FM chrominance signal has been removed, and only the lower sideband wave has been transmitted. However, in accordance with the present invention, the lower sideband wave may be removed instead, with only the upper sideband wave of the FM chrominance signal being transmitted, and with the carrier frequency of the modulated chrominance signal being then set so that the transmitted upper sideband wave is at a frequency spaced by a substantial frequency from the band of a secondary distortion of the modulated luminance signal that may be generated.

Further, in the above-described embodiment of the invention, the luminance signal Y and the carrier chrominance signal C are respectively frequency modulated. However, the present invention may be applied similarly to the transmission of luminance and carrier chrominance signals that are modulated according to other modulation systems. For example, a red difference signal and a blue difference signal, which are baseband signals, may be modulated in place of a carrier chrominance signal and then be transmitted optically. In such case, when the optical transmitter is changed to accommodate the modulation of a red difference signal and a blue difference signal instead of a carrier chrominance signal, the optical receiver has to be correspondingly changed.

In the above-described embodiment, specific reference has been made to the transmission of a video signal according to the NTSC standard. However, it is obvious that such embodiment can also be applied to optically transmitting a video signal according to the PAL or other standards. Further, in the specifically described embodiment an FM luminance signal $Y_{FM}$ and an FM chrominance signal $C_{FM}$ occupying different frequency bands, respectively, but which together comprise a video signal, are transmitted optically. However, it will be apparent that the present invention can be similarly applied to the optical transmission of a plurality of independent signals which are in different frequency bands, respectively.

Thus, by way of summary, an optical transmitter according to the present invention is generally characterized by the removal of a sideband wave on one or the other side of a modulated signal in a predetermined frequency band when modulated signals in a plurality of respective frequency bands are transmitted so that the transmission band of the signal from which the sideband wave has been removed can be maintained in a predetermined range. For example, by removing a sideband wave on either side of the FM chrominance signal obtained by modulating the frequency of a carrier chrominance signal, the resulting FM chrominance signal can be transmitted within a transmission band of 20 to 30 MHz, as prescribed by the EIAJ. Further, with the FM chrominance signal having a sideband wave removed from one side prior to transmission, the effect of a secondary distortion of an FM luminance signal on the FM chrominance signal can be reduced at the time of reception by setting the carrier frequency of the FM chrominance signal so that the sideband wave of the FM chrominance signal remaining at the time of transmission is at a substantial frequency from the band in which the secondary distortion of the FM luminance signal is mainly generated, with the result that a satisfactory chrominance signal can be obtained after transmission.

Although illustrative embodiments of the present invention, and various modifications thereof, have been described in detail herein with reference to the accompanying drawings, it is to be understood that the invention is not limited to those precise embodiments and described modifications, and that various changes and further modifications may be effected therein by one skilled in the art without departing from the scope or spirit of the invention as defined in the appended claims.

What is claimed is:

1. An optical transmitter, comprising:
   signal processing means for respectively modulating a plurality of electrical signals and providing respective modulated signals in a plurality of respective frequency bands with at least one of said modulated signals having sideband waves at opposite sides of the respective frequency band;
   means for removing one of said sideband waves from said at least one of the modulated signals having sideband waves at opposite sides of the respective frequency band; and
   electro-optical transducing means for transducing said at least one modulated signal from which said one sideband wave has been removed, and for transducing another of said modulated signals in said plurality of frequency bands into respective optical signals.

2. An optical transmitter according to claim 1;
   wherein said electrical signals include a luminance signal and a chrominance signal, and said signal processing means modulates said luminance signal so as to provide a respective modulated luminance signal in a first frequency band and modulates said chrominance signal to provide a respective modulated chrominance signal in a second frequency band which is adjacent to said first frequency band; and wherein said means for removing said one of the sideband waves acts on said modulated chrominance signal for removing said one sideband wave from said second frequency band.

3. An optical transmitter according to claim 2;

wherein said means for removing said one of the sideband waves includes respective trap circuit means through which said modulated chrominance signal is supplied to said electro-optical transducing means.

4. An optical transmitter according to claim 2;

wherein said modulated chrominance signal in said second frequency band has a carrier frequency set so that the sideband wave remaining in said second frequency band is spaced by a substantial frequency from a band in which a secondary distortion of said modulated luminance signal in said first frequency band is substantially generated.

5. An optical transmitter according to claim 2;

wherein said modulated chrominance signal in said second frequency band has a carrier frequency set so that the sideband wave remaining in said second frequency band is between said first frequency band and a band in which a secondary distortion of said modulated luminance signal in said first frequency band is substantially generated.

6. An optical transmitter according to claim 1;

wherein said electro-optical transducing means includes infrared-emitting diode means, and driving means for driving said diode means in accordance with said respective modulated signals.

7. An optical transmission method, comprising:

modulating a plurality of electrical signals so as to provide respective modulated signals in a plurality of respective frequency bands with at least one of said modulated signals having sideband waves at opposite sides of the respective frequency band;

removing a sideband wave from said at least one of the modulated signals having sideband waves at opposite sides of the respective frequency band; and electro-optically transducing said at least one modulated signal from which said one sideband wave has been removed and another of said modulated signals in said plurality of frequency bands into respective optical signals.

8. An optical transmission method according to claim 7;

wherein said electrical signals include a luminance signal and a chrominance signal, and said luminance signal is modulated so as to provide a respective modulated luminance signal in a first frequency band and said chrominance signal is modulated to provide a respective modulated chrominance signal in a second frequency band which is adjacent to said first frequency band; and wherein said one sideband wave is removed from said modulated chrominance signal in said second frequency band.

9. An optical transmission method according to claim 8;

further comprising setting a carrier frequency of said modulated chrominance signal in said second frequency band so that a sideband wave remaining in said second frequency band is spaced by a substantial frequency from a band in which a secondary distortion of said modulated luminance signal in said first frequency band is substantially generated.

10. An optical transmission method according to claim 8;

further comprising setting a carrier frequency of said modulated chrominance signal in said second frequency band so that a sideband wave remaining in said second frequency band is between said first frequency band and a band in which a secondary distortion of said modulated luminance signal in said first frequency band is substantially generated.

11. An optical transmission system comprising:

an optical transmitter including signal processing means for respectively modulating a plurality of input electrical signals and providing respective modulated input signals in a plurality of respective frequency bands with at least one of said modulated input signals having sideband waves at opposite sides of the respective frequency band, means for removing one of said sideband waves from said at least one of the modulated input signals having sideband waves at opposite sides of the respective frequency band, and transmitting electro-optical transducing means for transducing said at least one modulated input signal from which said one sideband wave has been removed and for transducing another of said modulated input signals in said plurality of frequency bands into respective transmitted optical signals; and an optical receiver including receiving electro-optical transducing means for receiving said transmitted optical signals and for transducing the received optical signals into a corresponding electrical output, means for preamplifying said electrical output, filter means for extracting from the preamplified electrical output said respective frequency bands and thereby providing respective modulated received signals, means for restoring said one of the sideband waves to the modulated received signal corresponding to the modulated input signal from which said one sideband wave was removed, and means for demodulating said respective modulated received signals so as to provide respective output electrical signals corresponding to said input electrical signals, respectively.

12. An optical transmission system according to claim 11;

wherein said input electrical signals include an input luminance signal and an input chrominance signal, and said signal processing means frequency modulates said input luminance signal so as to provide a respective frequency modulated input luminance signal in a first frequency band and frequency modulates said input chrominance signal to provide a respective frequency modulated input chrominance signal in a second frequency band which is adjacent to said first frequency band; and wherein said means for removing said one of the sideband waves acts on said frequency modulated input chrominance signal for removing said one sideband wave from said second frequency band.

13. An optical transmission system according to claim 12;

wherein said means for removing said one of the sideband waves includes respective trap circuit means through which said frequency modulated input chrominance signal is supplied to said transmitting electro-optical transducing means of said optical transmitter.

14. An optical transmission system according to claim 12;

wherein said means for preamplifying said electrical output of the receiving electro-optical transducing means has a non-linear characteristic in respect to said modulated luminance and chrominance input signals in said first and second frequency bands, respectively, so as to generate a secondary distortion of the modulated received signal corresponding to said modulated input luminance signal in a predetermined frequency band; and wherein said modulated input chrominance signal in said second frequency band has a carrier frequency set so that the sideband wave remaining in said second frequency band is spaced by a substantial frequency from said band in which the secondary distortion of said modulated luminance signal in said first frequency band is substantially generated.

15. An optical transmission system according to claim 12;

wherein said modulated input chrominance signal in said second frequency band has a carrier frequency set so that the sideband wave remaining in said second frequency band is between said first frequency band and said band in which the secondary distortion of said modulated luminance signal in said first frequency band is substantially generated.

16. An optical transmission system according to claim 12;

wherein said frequency modulated input chrominance signal includes an amplitude modulated component upon the removal of said one sideband wave therefrom, and said means for restoring said one sideband wave to the frequency modulated received signal corresponding to the input chrominance signal includes amplitude limiting means for substantially eliminating said amplifier modulated component therefrom.

17. An optical transmitter for a video signal including at least a luminance signal and a chrominance signal, said transmitter comprising:

signal processing means for frequency modulating said luminance signal and said chrominance signal so as to provide a modulated luminance signal in a first frequency band and a modulated chrominance signal in a second frequency band which is higher than and adjacent to said first frequency band, with said modulated chrominance signal having primary lower and upper sideband waves at opposite sides of said second frequency band;

means for removing said upper sideband wave from said modulated chrominance signal; and electro-optical transducing means for transducing said modulated chrominance signal from which said upper sideband wave has been removed, and for transducing said modulated luminance signal.

18. An optical transmitter according to claim 17;

wherein said modulated luminance signal has a first frequency corresponding to a sink tip of said luminance signal and a second frequency corresponding to a white peak of said luminance signal; and wherein a carrier frequency of said modulated chrominance signal is set to space said lower sideband wave by a substantial frequency from a frequency band extending from twice said first frequency corresponding to said sink tip to twice said second frequency corresponding to said white peak.

19. An optical transmitter according to claim 18;

wherein said first frequency is substantially 11.5 MHz and said second frequency is substantially 13.5 MHz, said first frequency band is from 6 to 20 MHz and said second frequency band is from 20 to 30 MHz; and wherein said carrier frequency is set in a range from 25.08 MHz to 26.08 MHz in the event said video signal is according to the NTSC standard, and said carrier frequency is set in a range from 25.93 MHz to 26.93 MHz in the event said video signal is according to the PAL standard.

20. An optical transmitter according to claim 18;

wherein said first frequency is substantially 11.5 MHz and said second frequency is substantially 13.5 MHz, said first frequency band is from 6 to 20 MHz, and said second frequency band is from 20 to 30 MHz; and wherein said carrier frequency is set in a range from 25.93 to 26.08 MHz.

* * * * *